(12) United States Patent
Prokhorov (10) Patent No.: US 10,875,645 B2
(45) Date of Patent: Dec. 29, 2020

(54) TELEPRESENCE DRONES AND TELEPRESENCE DRONE SYSTEMS

(71) Applicant: TOYOTA MOTOR ENGINEERING & MANUFACTURING NORTH AMERICA, INC., Plano, TX (US)

(72) Inventor: Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 261 days.

(21) Appl. No.: 16/021,611

(22) Filed: Jun. 28, 2018

(65) Prior Publication Data
US 2020/0001994 A1    Jan. 2, 2020

(51) Int. Cl.
| | |
|---|---|
| *G05D 1/00* | (2006.01) |
| *B64C 39/02* | (2006.01) |
| *G08G 5/00* | (2006.01) |
| *B64C 1/40* | (2006.01) |
| *B64F 1/12* | (2006.01) |
| *B64F 1/36* | (2017.01) |
| *H04N 7/18* | (2006.01) |

(52) U.S. Cl.
CPC ............. B64C 39/024 (2013.01); B64C 1/40 (2013.01); B64F 1/12 (2013.01); B64F 1/362 (2013.01); G08G 5/0069 (2013.01); *B64C 2201/02* (2013.01); *B64C 2201/122* (2013.01); *B64C 2201/141* (2013.01); *H04N 7/185* (2013.01)

(58) Field of Classification Search
CPC ... B64C 39/024; B64C 1/40; B64C 2201/122; B64C 2201/141; B64C 2201/02; B64C 2201/027; B64C 2201/162; B64C 2201/108; B64C 2201/042; G08G 5/0069; G08G 5/0013; G08G 5/0021; G08G 5/025; B64F 1/12; B64F 1/362; H04N 7/185; G05D 1/00
USPC .......... 701/3; 244/5, 26, 30, 50, 63; 455/410
See application file for complete search history.

(56) References Cited

U.S. PATENT DOCUMENTS

| | | | | |
|---|---|---|---|---|
| 9,505,493 | B2* | 11/2016 | Borko | B64C 39/024 |
| 9,505,494 | B1 | 11/2016 | Marlow | |
| 2007/0228214 | A1* | 10/2007 | Horak | B64C 39/028 |
| | | | | 244/63 |
| 2013/0078945 | A1* | 3/2013 | Lavi | H04W 84/22 |
| | | | | 455/410 |
| 2016/0137293 | A1* | 5/2016 | Santangelo | B64C 37/00 |
| | | | | 244/50 |
| 2016/0200415 | A1* | 7/2016 | Cooper | A63H 27/12 |
| | | | | 244/17.15 |
| 2017/0029098 | A1* | 2/2017 | Sopper | H04L 67/10 |
| 2017/0251181 | A1* | 8/2017 | Smolyanskiy | G05D 1/005 |
| 2017/0259183 | A1* | 9/2017 | Matloff | G08C 23/04 |
| 2017/0355459 | A1* | 12/2017 | Erickson | B64C 39/024 |
| 2017/0357263 | A1* | 12/2017 | Glatfelter | G06Q 50/30 |
| 2018/0016006 | A1* | 1/2018 | Tian | B64D 1/22 |

(Continued)

*Primary Examiner* — Shardul D Patel
(74) *Attorney, Agent, or Firm* — Dinsmore & Shohl LLP (57) ABSTRACT

A telepresence drone that is configured to navigate through an environment includes a frame, a propulsion system comprising propellers and motors coupled to the frame, an electronic control unit in communication with the propulsion system, and a hull positioned outside of the frame and the propulsion system. The hull includes a plurality of openings through which the propulsion system acts on air to navigate through the environment.

19 Claims, 8 Drawing Sheets

(56) References Cited

U.S. PATENT DOCUMENTS

2018/0017973 A1\* 1/2018 Teague ................. G08G 5/0069
2018/0082682 A1   3/2018 Erickson
2019/0028903 A1\* 1/2019 Carpenter ............. H04W 16/26

\* cited by examiner

TELEPRESENCE DRONES AND TELEPRESENCE DRONE SYSTEMS

TECHNICAL FIELD

The present specification generally relates to drones, and more specifically, telepresence drones and telepresence drone systems that provide users with a high quality telepresence experience.

BACKGROUND

Conventional teleconferencing systems allow users to interact with remotely located users by providing audio and video feeds, thereby providing the users to feel as if they are more present with one another. Conventional teleconferencing systems have been integrated into land-based vehicles, which provide some limited mobility to the teleconferencing systems throughout a facility. Such limited mobility may prevent the users from having an experience that has a high quality and feels sufficiently present.

Accordingly, a need exists for telepresence drones and telepresence drone systems that provide users with a high quality telepresence experience.

SUMMARY

In one embodiment, a telepresence drone that is configured to navigate through an environment includes a frame, a propulsion system comprising propellers and motors coupled to the frame, an electronic control unit in communication with the propulsion system, and a hull positioned outside of the frame and the propulsion system. The hull includes a plurality of openings through which the propulsion system acts on air to navigate through the environment.

In another embodiment, a telepresence drone system includes a telepresence drone and a plurality of landing pads. The telepresence drone is configured to navigate through an environment and includes a frame, a propulsion system comprising propellers and motors coupled to the frame, an electronic control unit in communication with the propulsion system, a hull positioned outside of the frame and the propulsion system, and a landing interface that is coupled to one of the frame or the hull. The plurality of landing pads are arranged throughout the environment and each of the landing pads is configured to selectively couple to the landing interface of the telepresence drone.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Telepresence drones and telepresence drone systems according to the present specification include elements that provide users with a high quality telepresence experience. Telepresence drones according to the present specification include a configuration, including having a hull positioned outside of a frame and a propulsion system, that allows the telepresence drone to navigate throughout an environment without concern of contact between the telepresence drone and individuals or barriers in the environment. By allowing the telepresence drone to navigate throughout an environment, users of the telepresence drone may enjoy a highly interactive telepresence experience. Telepresence drone systems according to the present disclosure include a plurality of landing pads that are arranged throughout an environment. The telepresence drone may navigate to one of the landing pads and may be selectively coupled to the landing pads, such that the telepresence drone may be maintained in position while its propulsion system is deactivated. Selective coupling of the telepresence drone to the landing pad may allow for more energy efficient usage of the telepresence drone and interruption of the propulsion system when in proximity to a landing pad, which may improve the telepresence experience for users.

Figure 1:
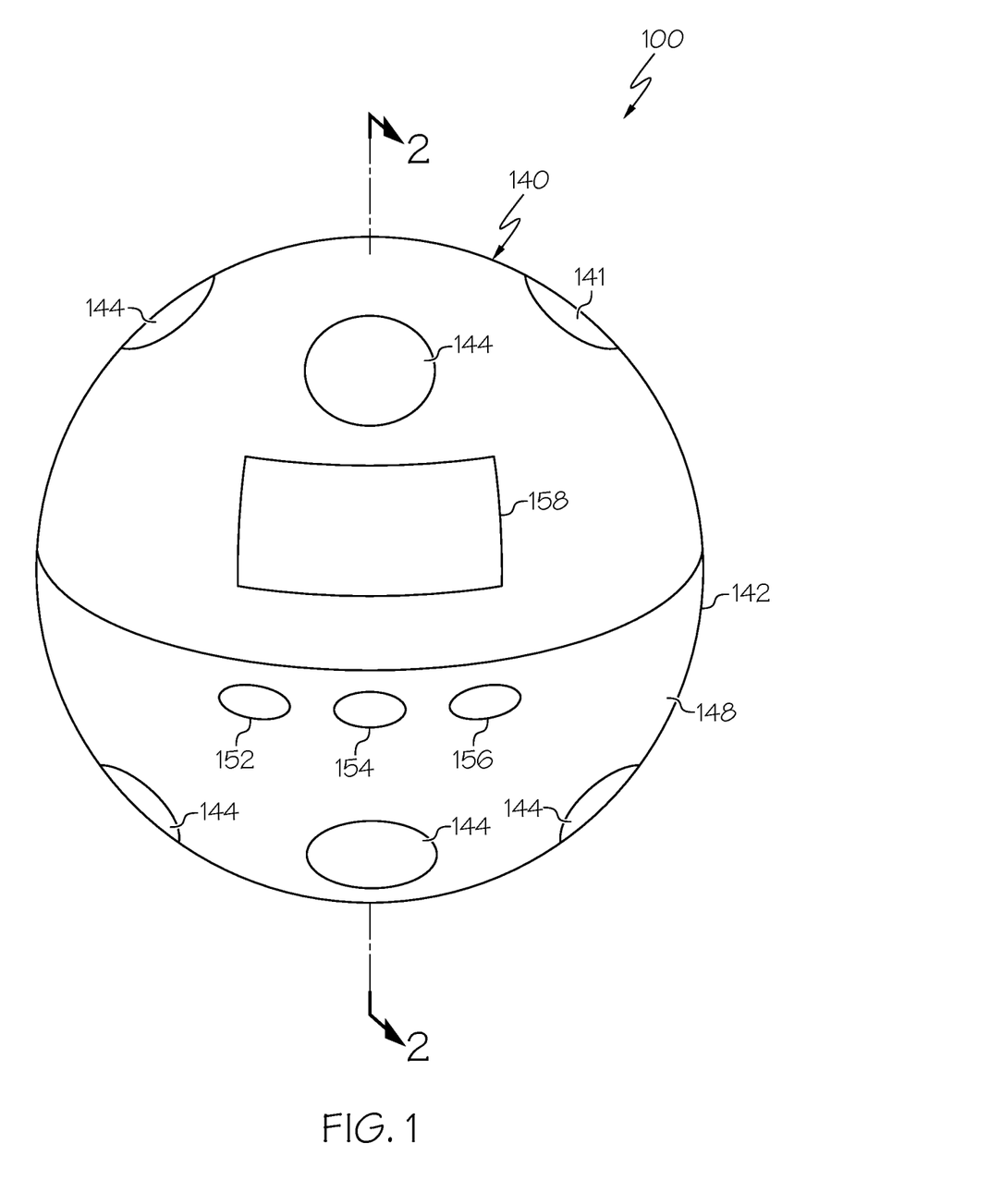
FIG. 1 schematically depicts a perspective view of a telepresence drone according to one or more embodiments shown or described herein.
Figure 2:
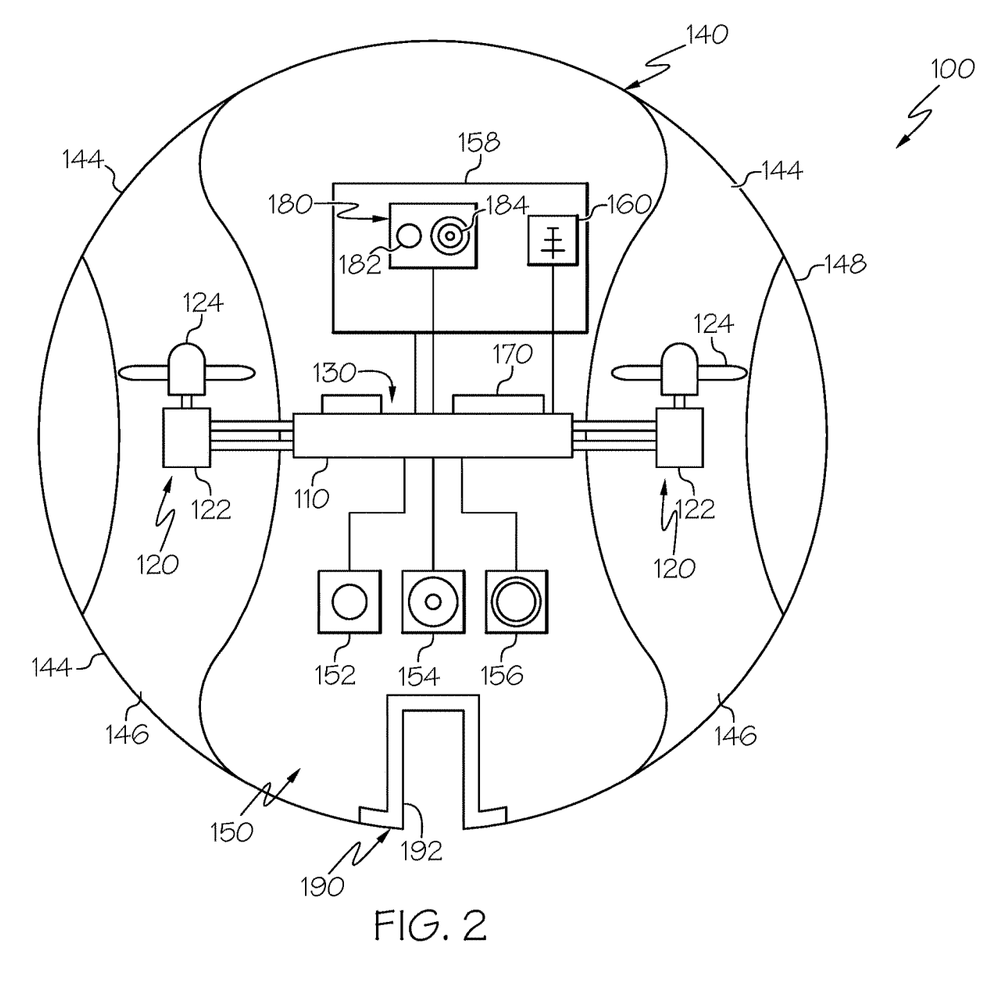
FIG. 2 schematically depicts a side cross-sectional view of the telepresence of FIG. 1 according to one or more embodiments shown and described herein.

Referring now to FIGS. 1 and 2, one embodiment of a telepresence drone 100 is depicted. In the depicted embodiment, the telepresence drone 100 includes a frame 110, a propulsion system 120 that includes a plurality of motors 122 that are coupled to the frame 110 and a corresponding plurality of propellers 124 that are coupled to the motors 122, and an electronic control unit 130 that is in communication with the plurality of motors 122 of the propulsion system 120. The telepresence drone 100 also includes a hull 140 that is positioned outside of the frame 110 and the propulsion system 120, such that the hull 140 envelops the frame 110 and the propulsion system 120.

In various embodiments, the hull 140 may exhibit a variety of shapes, including having a generally spherical shape 142, as depicted in FIGS. 1 and 2, cylindrical, cubical, tetrahedral, and the like. The hull 140 may circumscribe the remaining components of the telepresence drone 100, such that the hull 140 is the outer-most element at every position of the telepresence drone 100. In various embodiments, the hull 140 may be made from materials that exhibit high toughness and elasticity, such that contact between the hull 140 and, for example, barriers in the environment do not cause damage to the hull 140 that would render the telepresence drone 100 inoperable. In some embodiments, the hull 140 is generally rigid to stresses applied, for example, during a collision at the maximum operating speed of the telepresence drone 100. In some embodiments, the hull 140 is flexible to stresses applied during a collision at the maximum operating speed of the telepresence drone 100. In some embodiments, the hull 140 may be made from a polymer material, for example, polyethylene, polyurethane, polypropylene, polyvinyl chloride, nylon, polyepoxide, and the like. In some embodiments, the polymer material may be reinforced with a matrix material, for example, metal, glass, or carbon-based fibers that are at least partially embedded within the polymer material.

The hull 140 may include a plurality of openings 144 through which the propulsion system 120 acts on air in the environment to allow the telepresence drone 100 to navigate. Referring to FIG. 2, one embodiment of the telepresence drone 100 may include ducted portions 146 that extend from the outer surface 148 of the hull toward one of the propellers 124. The ducted portions 146 may provide air into and away from the propellers 124, such that the propellers 124 provide sufficient thrust as to navigate the telepresence drone 100 throughout the environment.

Figure 3:
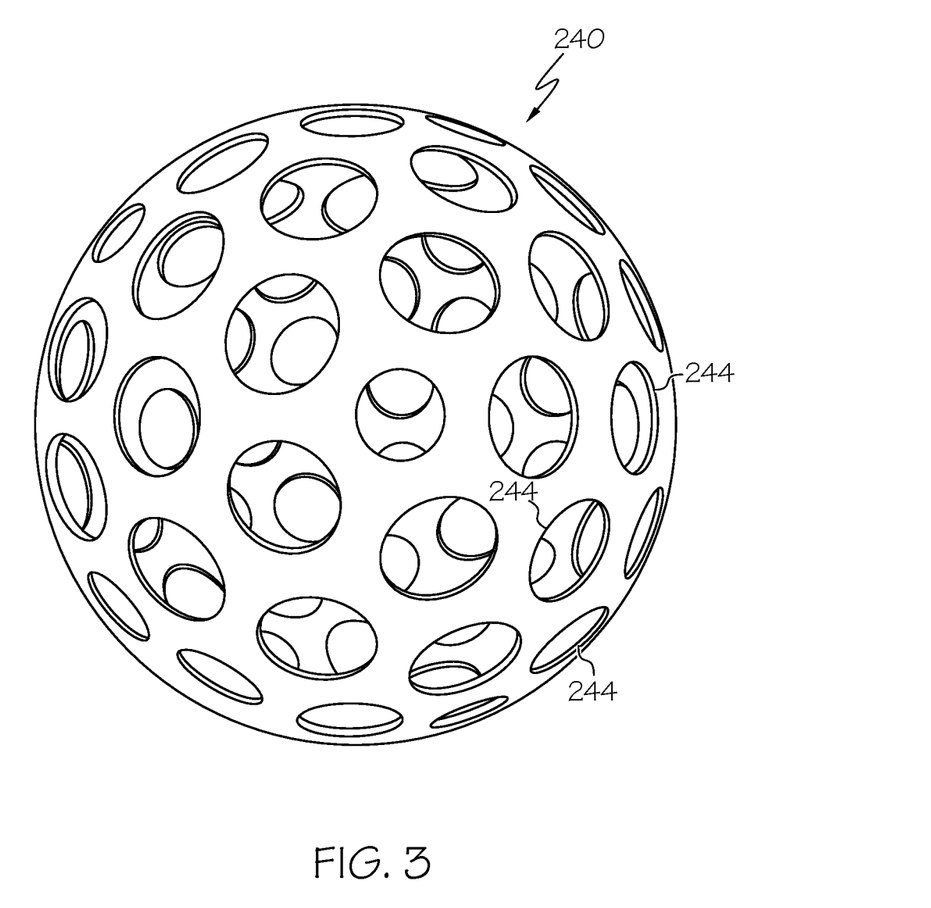
FIG. 3 schematically depicts a perspective view of a hull for a telepresence drone according to one or more embodiments shown and described herein.

Referring to FIG. 3, another embodiment of the hull 240 is depicted, in which the hull 240 includes a plurality of openings 244 through which the propulsion system 120 acts on air in the environment to navigate. The hull 240 includes openings 244 that are positioned throughout the hull 240. The openings 244 allow for air to pass between regions exterior to the hull 240 and interior to the hull 240, with a minimum of restriction on air flow, such that the propellers of the propulsion system can continue to act on the air as to provide sufficient thrust as to navigate the telepresence drone throughout the environment.

Referring again to FIGS. 1 and 2, the telepresence drone 100 includes an electronic control unit 130 that is in communication with the motors 122 of the propulsion system 120. The electronic control unit 130 may also be in communication with telepresence equipment 150, which may include, for example, a microphone 152, a speaker 154, a camera 156, a display 158, and a wireless data interface 160. Some embodiments of the telepresence drone 100 may include less than all of the recited elements of the telepresence equipment 150. The telepresence equipment 150 allows the telepresence drone 100 to capture the images and/or audio of a user of the telepresence drone 100. The images and/or audio of the user of the telepresence drone 100 may then be transmitted to a remote location such that users may interact with one another while being located at remote locations.

In some embodiments, the telepresence drone 100 may include a wireless data interface 160 that is in communication with the electronic control unit 130. The wireless data interface 160 may be in wireless communication with a network (as will be described below), so that the wireless data interface 160 may transfer data from the telepresence drone 100 to the network. The wireless data interface 160 may communicate using a variety of networking topology and/or communication protocols, and can be otherwise implemented as a combination of two or more networks. The wireless data interface 160 may be implemented to support several radio access technologies, which may include Wi-Fi, Bluetooth™, Mobile Broadband, and LTE, as well as 802.11a/b/g/n/ac network connectivity technologies, and/or any other wireless communication system or format. In various embodiments, the wireless data interface 160 may transfer data to and/or from the telepresence equipment 150 of the telepresence drone 100 to the network such that the telepresence drone 100 may provide the desired telepresence immersive experience to the local and remote users.

In some embodiments, the telepresence drone 100 may include a route planner instruction set that is stored within a memory 170. The route planner instruction set may be executed by the electronic control unit 130 so that the electronic control unit 130 evaluates the location of a user within an environment. The electronic control unit 130 may continue to execute the route planner instruction set to develop a navigation route within the environment, such that the telepresence drone 100 navigates to a position proximate to the user. The route planner instruction set may provide predetermined location and orientation specifications that correspond to an appropriate location of the telepresence drone 100 relative to the user. For example, the predetermined location and orientation specifications may provide a maximum and minimum distance that the telepresence drone should be within relative to the user.

In some embodiments, the route planner instruction set also provides instructions as to whether the telepresence drone 100 should return to a stationary landing pad, as described below. The electronic control unit 130 may determine if one of the landing pads is positioned within the predetermined location and orientation specifications and, if so, direct the telepresence drone 100 to navigate to a position in which the telepresence drone 100 can be coupled to the landing pad.

In some embodiments, the route planner instruction set may be executed by the electronic control unit 130 so that the electronic control unit 130 evaluates the orientation of a user within an environment, and instructs the telepresence drone 100 to navigate to a position such that the telepresence drone 100 positions the telepresence equipment 150 in an appropriate location and orientation relative to the user. By positioning the telepresence equipment 150 such that desired image and/or audio of the local user is captured, the route planner instruction set may provide the desired telepresence immersive experience to the local and remote users. In one embodiment, the route planner instruction set may evaluate the location and orientation of a local user's face. By determining the location and orientation of the user's face, the route planner instruction set may provide navigation instructions to the telepresence drone 100 that tends to navigate the telepresence drone 100 in a position that is generally in front of the local user's body. By navigating the telepresence drone 100 to such a location, the telepresence equipment 150 of the telepresence drone 100 may be able to detect images and/or audio of the local user that provides a high quality reproduction of the local user. Those images and/or audio of the local user may be communicated to the remote users, such that the remote users are provided with the desired telepresence immersive experience.

In some embodiments, the telepresence drone 100 may include a noise cancelling system 180 that reduces the apparent volume of noise projected into the environment by the telepresence drone 100. In some embodiments, the noise cancelling system 180 may be integrated into the telepresence equipment 150. In some embodiments, the noise cancelling system 180 may employ additional elements beyond those of the telepresence equipment 150, including a microphone 182 and a speaker 184. In the depicted embodiment, the microphone 182 detects noise that is generated by the telepresence drone 100, for example, noise generated by the motors 122 and/or the propellers 124 of the propulsion system 120. The noise cancelling system 180 may process the detected noise and emit a signal with an equivalent amplitude to the detected noise but with an inverted phase to the original detected noise, thereby cancelling each other out. Such a noise cancelling system 180 may reduce to volume of perceivable noise that is output by the telepresence drone 100 and may improve the audio signal capture of the local user that are captured by the telepresence equipment 150. The noise cancelling system 180 may improve the telepresence immersive experience to the local user by reducing the noise that the telepresence drone 100 has in its immediate vicinity and may reduce distractions that the telepresence drone 100 may have upon other individuals who are in proximity to the telepresence drone 100.

In some embodiments, the telepresence drone 100 includes a landing interface 190 that is coupled to one of the frame 110 or the hull 140. As will be described in greater detail below, the landing interface 190 allows for the telepresence drone 100 to be selectively coupled to a landing pad. The landing interface 190 provides support to the telepresence drone 100, such that when the landing interface 190 is selectively coupled to a landing pad, the propulsion system 120 of the telepresence drone 100 may be deactivated.

Figure 4:
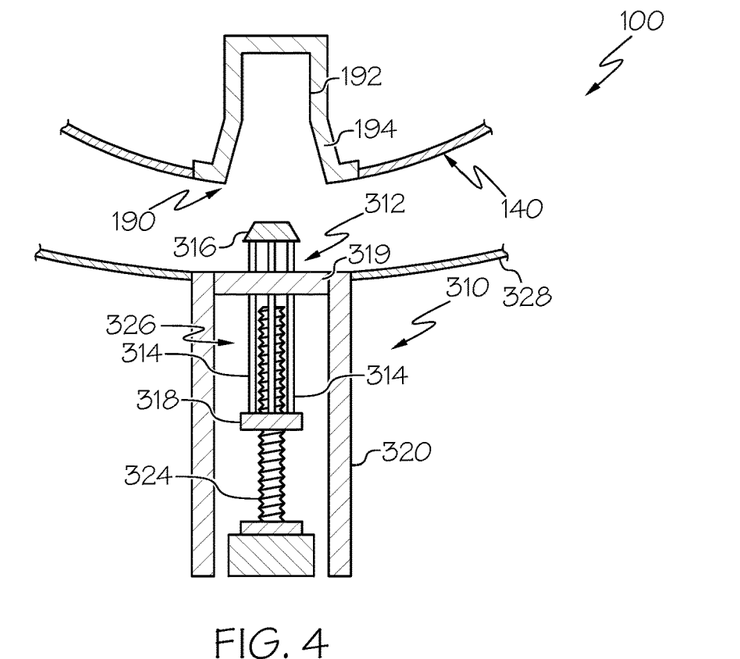
FIG. 4 schematically depicts a partial side sectional view of a telepresence drone and a landing pad according to one or more embodiments shown and described herein.
Figure 5:
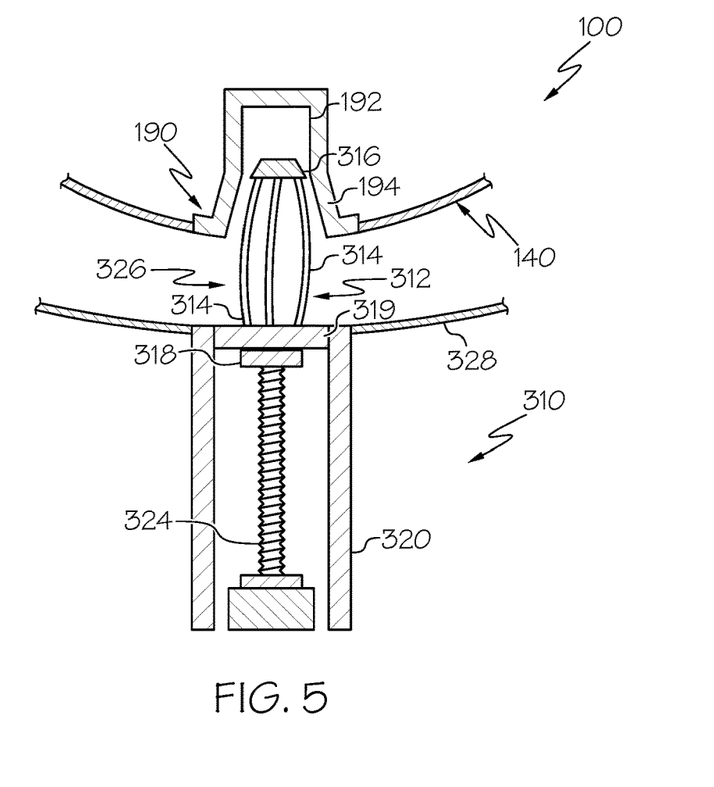
FIG. 5 schematically depicts the telepresence drone and the landing pad of FIG. 4.

Referring now to FIGS. 4 and 5, one embodiment of a telepresence drone 100 and a landing pad 310 is depicted. In the depicted embodiment, the telepresence drone 100 includes a landing interface 190 that is generally positioned along the bottom of the telepresence drone 100. It should be understood that the landing interface 190 may be located at a variety of positions around the telepresence drone 100 without departing from the scope of the present disclosure, and the particular location of the landing interface 190 is not meant to be limiting. In various embodiments, the telepresence drone 100 and the landing pad 310 may include a beacon and detection system, for example, an infrared emitter located on the landing pad 310 and an infrared detector located on the telepresence drone 100. The beacon and detection system may provide for improved positioning of the telepresence drone 100 relative to the landing pad 310, and may allow for more reliable coupling of the telepresence drone 100 to the landing pad 310. The telepresence drone 100 may communicate wirelessly with the landing pad 310, such that the telepresence drone 100 may command the landing pad 310 to selectively couple or decouple to the landing interface 190 of the telepresence drone 100.

The landing interface 190, as depicted in FIGS. 4 and 5, includes a generally cylindrical recess 192 that extends inward relative to the hull 140 of the telepresence drone 100. The landing interface 190 may include a tapered inlet 194 that tapers inward in diameter from the hull 140. The tapered inlet 194 that allows for increased misalignment between the landing interface 194 and the landing pad 310.

The landing pad 310 includes an extensible frame 312 that translates outward from shell portion 320. The extensible frame 312 includes a plurality of finger elements 314 that are maintained in position by a leading keeper 316 and a trailing keeper 318, which translate along the shell portion 320 with the finger elements 314, and an intermediate keeper 319 that is maintained in position relative to the shell portion 320. In various embodiments, the leading keeper 316 includes a tapered portion to mate with the landing interface 190 of the telepresence drone 100.

When the telepresence drone 100 is located in a position in which the telepresence drone 100 may be selectively coupled to the landing pad 310, an electric motor 322 that is positioned within the shell portion 320 is commanded to drive a power screw 324, which translates the trailing keeper 318 outward from the shell portion 320. The trailing keeper 318 translates the finger elements 314 and the leading keeper 316 outward from the shell portion 320 while also providing rotation to the finger elements 314, thereby increasing an interface diameter 326 of the landing pad 310, as the extensible frame 312 is translated away from the shell portion 320. The telepresence drone 100 may be maintained in a position that allows the extensible frame 312 of the landing pad 310 to be positioned within the landing interface 190 of the telepresence drone 100. The landing pad 310, through translating the extensible frame 312 into the landing interface 190 and through increasing the interface diameter 326 of the landing pad 310, may selectively couple the landing interface 190 of the telepresence drone 100 to the landing pad 310.

To release the telepresence drone 100 from being coupled to the landing pad 310, the electric motor 322 may reverse, thereby drawing the extensible frame 312 back toward the shell portion 320. Drawing the extensible frame toward the shell portion 320 may reduce the interface diameter 326 of the landing pad 310, which may interrupt any contact between the finger elements 314 and the cylindrical recess 192 of the landing interface 190. With no or limited contact between the finger elements 314 and the cylindrical recess 192, the telepresence drone 100 is again free to navigate throughout the environment.

The finger elements 314 may be made from a material that is capable of being deformed repeatedly for extended periods of time with a long life. Such materials may include, for example and without limitation, spring steels.

The landing pad 310 may also include a shield support 328 that surrounds the shell portion 320. The shield support 328 may contact the hull 140 of the telepresence drone 100 and may provide additional stability to the telepresence drone 100 when the telepresence drone 100 is coupled to the landing pad 310. The shield support 328 may minimize axial misalignment of the telepresence drone 100 relative to the landing pad 310, and may assist the telepresence drone 100 with evaluating the location of the landing pad 310 when approaching the landing pad 310 prior to being coupled.

Figure 6:
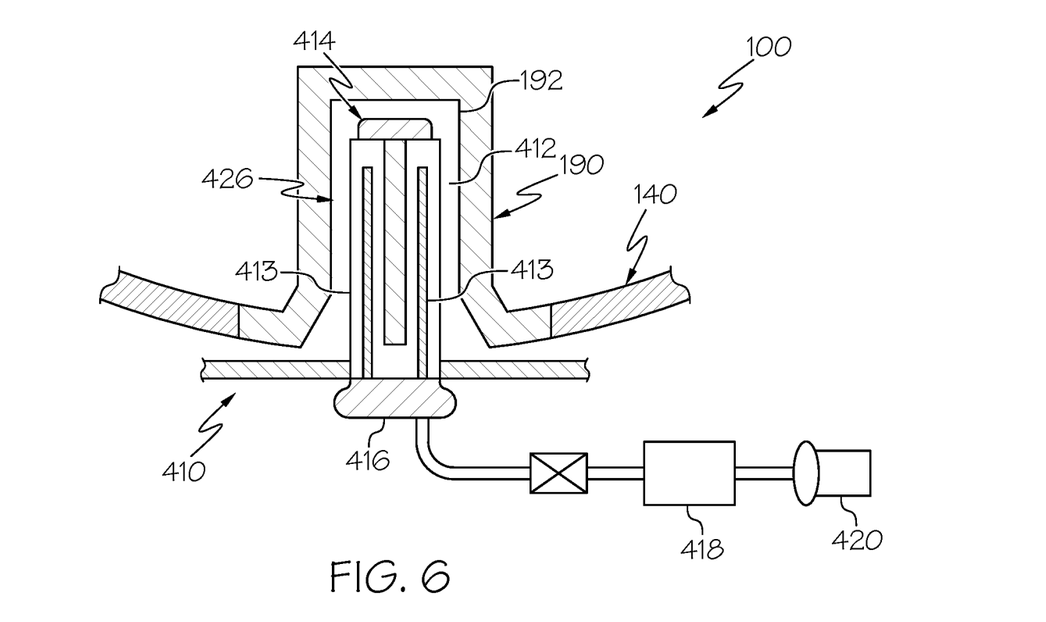
FIG. 6 schematically depicts a partial side sectional view of a telepresence drone and a landing pad according to one or more embodiments shown and described herein.
Figure 7:
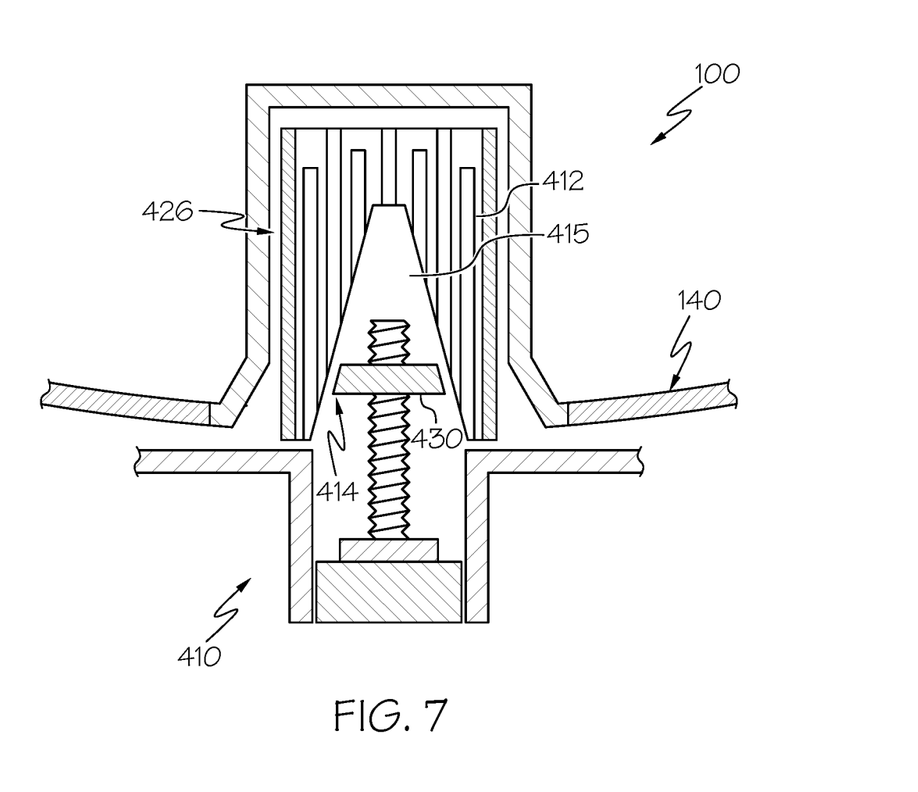
FIG. 7 schematically depicts a partial side sectional view of a telepresence drone and a landing pad according to one or more embodiments shown and described herein.

Referring now to FIGS. 6 and 7, additional embodiments of a landing pad 410 are depicted. In the depicted embodiments, the landing pad 410 includes an expandable sheath 412 that is positioned over a separating element 414. In the embodiment depicted in FIG. 6, the separating element 414 includes an inflatable bladder 416 that is in fluid communication with a high pressure reservoir 418. In some embodiments, the high pressure reservoir 418 is in fluid communication with a pump 420. When the telepresence drone 100 is located in a position in which the telepresence drone 100 may be selectively coupled to the landing pad 410, high pressure fluid may be directed from the high pressure reservoir 418 into the inflatable bladder 416. Introduction of this high pressure fluid tends to increase the volume of the inflatable bladder 416, which correspondingly increases an interface diameter 426 of the landing pad 410. The expandable sheath 412 may increase in diameter to introduce a force to the cylindrical recess 192 of the landing interface 190 of the telepresence drone 100 to allow the telepresence drone 100 to be coupled to the landing pad 410. Conversely, when the telepresence drone 100 is selected to be decoupled from the landing pad 410, high pressure fluid may be evacuated from the inflatable bladder 416 and the expandable sheath 412 may contract and decrease in diameter, thereby reducing the force of contact and/or eliminating contact between the expandable sheath 412 and the cylindrical recess 192 of the landing interface 190 of the telepresence drone 100.

Incorporation of the expandable sheath 412 into the landing pad 410 may allow for materials having higher wear resistance than the inflatable bladder 416 to come into direct contact with the landing interface 190 of the telepresence drone 100. In some embodiments, the expandable sheath 412 may be made from, for example, a metal that has a series of channels 413 that pass through its thickness. The channels 413 interrupt the stiffness of the expandable sheath 412, such that pressure provided by the inflatable bladder 416 is sufficient to elastically deform the expandable sheath 412 such that the interface diameter 426 can be cycled between configurations that would tend to couple with the landing interface 190 and decouple from the landing interface 190 without causing permanent deformation of the expandable sheath 412.

Referring now to the embodiment depicted in FIG. 7, the landing pad 410 includes an expandable sheath 412 that is positioned over a separating element 414. In the embodiment depicted in FIG. 7, the expandable sheath 412 includes a wedge-shaped interior 415 and the separating element 414 includes a traversing wedge element 430 that may be selectively traversed into or out of from the expandable sheath 412. When the traversing wedge element 430 is traversed into the expandable sheath 412, the configurations of the wedge-shaped interior 415 of the expandable sheath 412 and the traversing wedge element 430 may tend to apply a force to the wedge-shaped interior 415 of the expandable sheath 412 that increases the interface diameter 426 of the landing pad 410. Conversely, when the traversing wedge element 430 is traversed out of the expandable sheath 412, the configurations of the wedge-shaped interior 415 of the expandable sheath 412 and the traversing wedge element 430 may tend to reduce the application of force to the wedge-shaped interior 415 of the expandable sheath 412 that decreases the interface diameter 426 of the landing pad 410.

When the telepresence drone 100 is located in a position in which the telepresence drone 100 may be selectively coupled to the landing pad 410, the traversing wedge element 430 may be directed into the expandable sheath 412, such that the expandable sheath 412 increase in diameter to introduce a force to the cylindrical recess 192 of the landing interface 190 of the telepresence drone 100 to allow the telepresence drone 100 to be coupled to the landing pad 410. Conversely, when the telepresence drone 100 is selected to be decoupled from the landing pad 410, the traversing wedge element 430 may be directed out of the expandable sheath 412 and the expandable sheath 412 may contract and decrease in diameter, thereby reducing the force of contact and/or eliminating contact between the expandable sheath 412 and the cylindrical recess 192 of the landing interface 190 of the telepresence drone 100.

Figure 8:
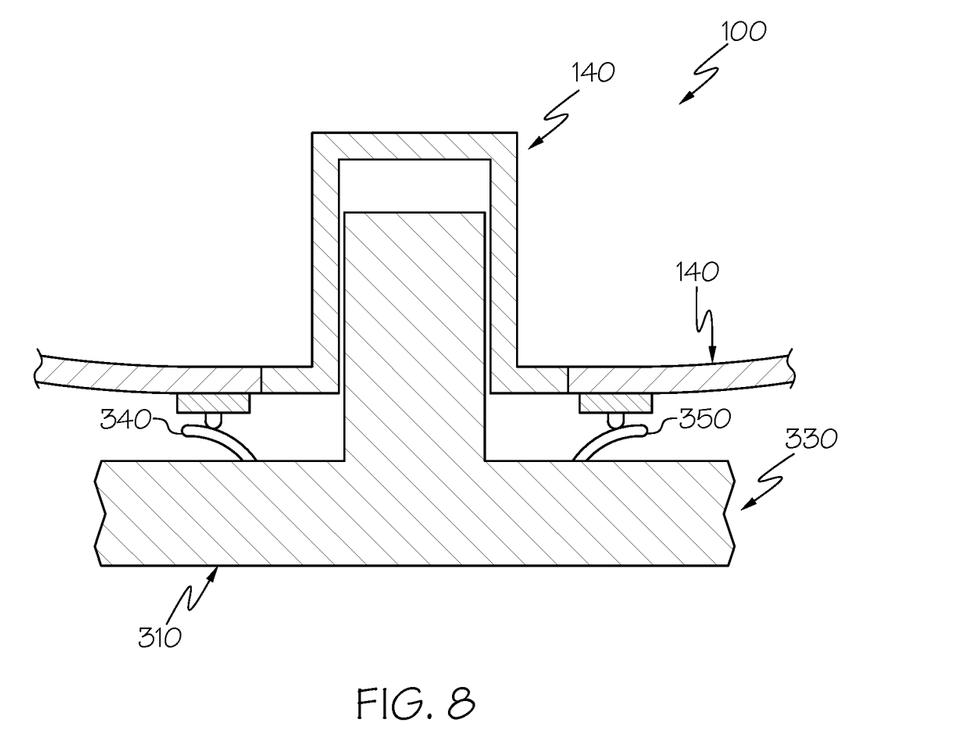
FIG. 8 schematically depicts a partial side sectional view of a telepresence drone and a landing pad according to one or more embodiments shown and described herein.

Referring now to FIG. 8, in some embodiments, the landing pad 310 may include a variety of docking elements 330, for example, a charging interface 340 that supplies power to the telepresence drone 100 and a wired communication interface 350 that provides a wired communication link between the telepresence drone 100 and a wired network. The landing pad 310 and the telepresence drone 100 may be configured such that the docking elements 330 make connections between the landing pad 310 and the telepresence drone 100 upon successful coupling of the telepresence drone 100 to the landing pad 310. The connections between the landing pad 310 and the telepresence drone 100 may be completed without intervention from any user. In some embodiments, the elements of the docking elements 330 may include electrical leads that make contact with corresponding electrical leads on the telepresence drone 100. In some embodiments, the charging interface 340 of the docking elements 330 includes an inductive charger that allows the telepresence drone 100 to receive power without direct contact between electrical leads position on the landing pad 310.

Figure 9:
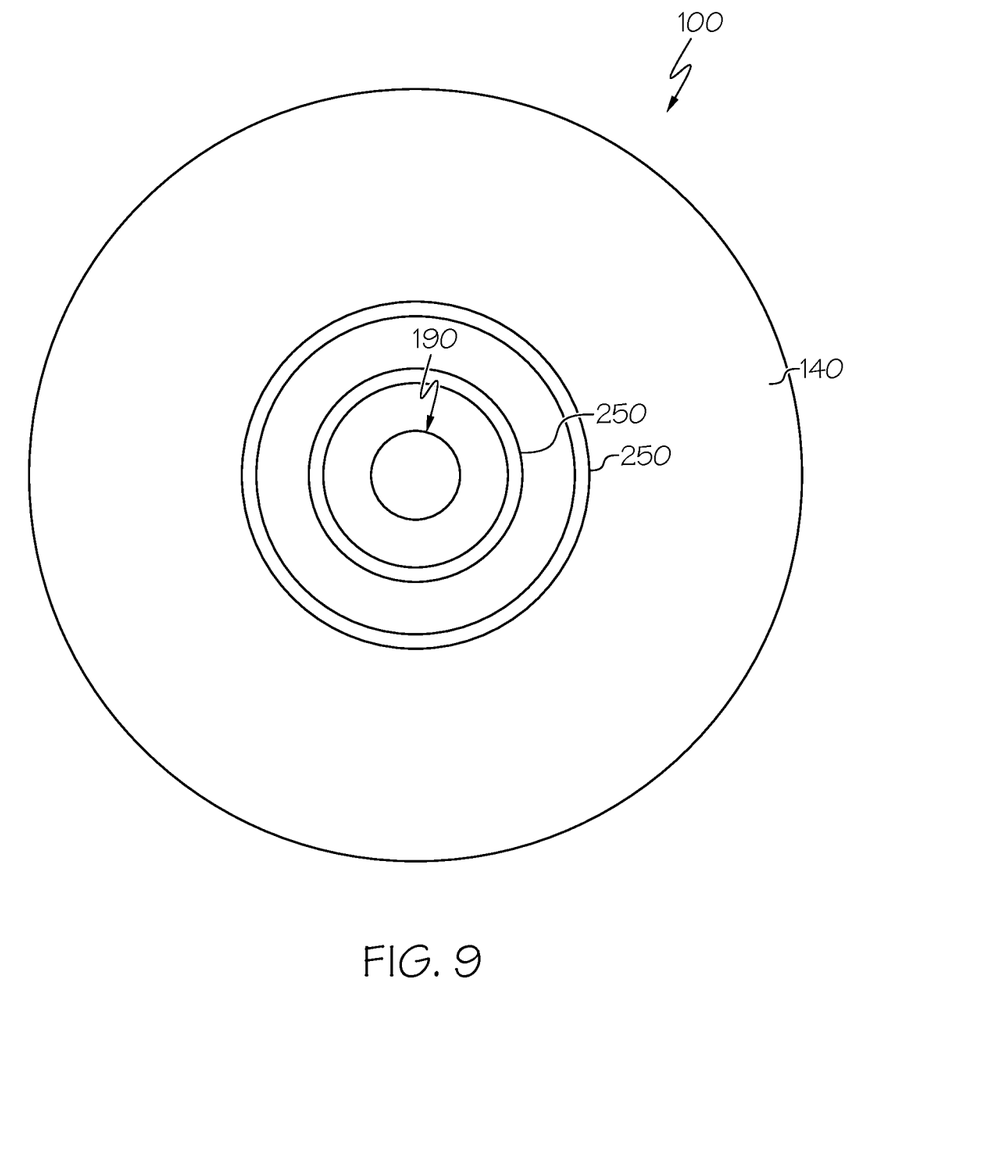
FIG. 9 schematically depicts a bottom view of a telepresence drone according to one or more embodiments shown and described herein.

Referring now to FIG. 9, in some embodiments, the telepresence drone 100 may include electrical contacts 250 that are positioned on the hull 140 and are arranged in an axisymmetric arrangement around an axis of the telepresence drone 100, and may be centered on the landing interface 190. The electrical contacts 250 may be brought into contact with the docking elements of the landing pad, as discussed hereinabove with regard to FIG. 8. Because the electrical contacts 250 have an axisymmetric arrangement around the landing interface 190, the electrical contacts 250 may maintain electrical continuity with the docking elements without regard to axial orientation of the telepresence drone 100 relative to the landing pad.

Figure 10:
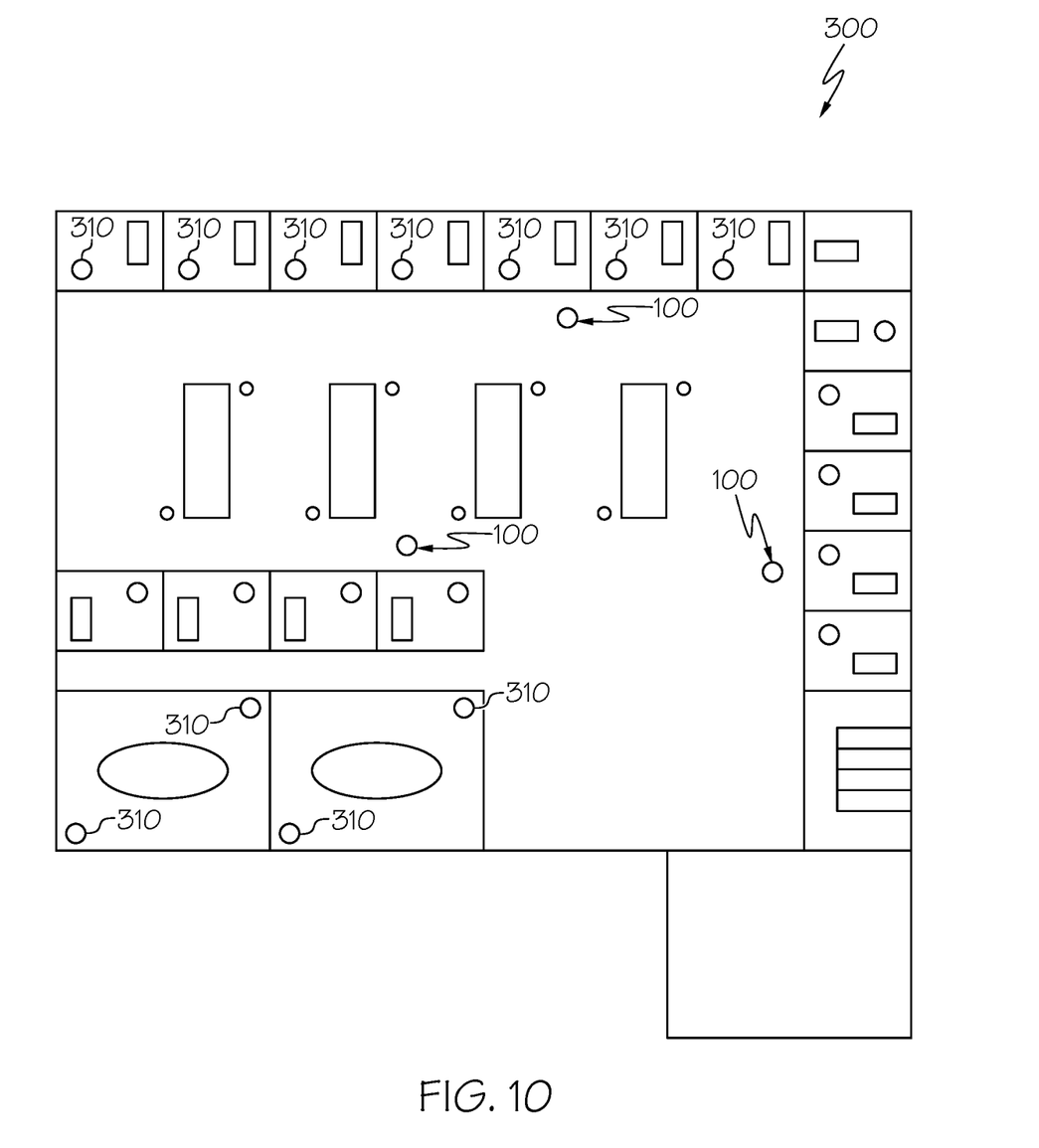
FIG. 10 schematically depicts a plan view of a telepresence drone system according to one or more embodiments shown and described herein.

Referring now to FIG. 10, a telepresence drone system 300 is depicted. In the depicted embodiment, the telepresence drone system 300 includes at least one telepresence drone 100 and a plurality of landing pads 310 that are arranged throughout an environment. In various embodiments, the telepresence drone system 300 may be deployed in interior or exterior environments in which an immersive telepresence experience is desired. In one example, a telepresence drone system 300 may be deployed in a workspace environment. The telepresence drone system 300 may include a plurality of landing pads 310 that are positioned proximate to individual workspaces from which users commonly work, for example, at desks, in laboratories, and/or in common meeting rooms.

Because the telepresence drones 100 of the telepresence drone system 300 are able to navigate freely throughout the environment without their navigation being interrupted by conventional barriers such as stairs, the telepresence drones 100 may follow individual users throughout the environment while the user moves from place to place. For example, when a user moves from a desk to a common meeting room, the telepresence drone 100 may follow that individual user, and continue to provide images and/or audio of that user to remote users. Continuity of the telepresence experience between the local individual user and remote users may provide a more immersive telepresence experience between the local and remote users, and may provide an enhanced sense of interactivity between the local and remote users.

The above-described telepresence drones include elements that provide users with a high quality telepresence experience. Telepresence drones according to the present specification include a hull that is positioned outside of a frame and a propulsion system. The hull allows the telepresence drone to navigate throughout an environment without concern of contact between the telepresence drone and individuals or barriers in the environment. By allowing the telepresence drone to navigate throughout an environment, local and remote users of the telepresence drone may enjoy a highly interactive telepresence experience. Telepresence drone systems according to the present disclosure include a plurality of landing pads that are arranged throughout an environment. The telepresence drone may navigate to one of the landing pads and may be selectively coupled to the landing pads, such that the telepresence drone may be maintained in position while its propulsion system is deactivated. Selective coupling of the telepresence drone to the landing pad may allow for more energy efficient usage of the telepresence drone and interruption of the propulsion system when in proximity to a landing pad, which may improve the telepresence experience for users.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A telepresence drone configured to navigate through an environment, the telepresence drone comprising:
   a frame;
   a propulsion system comprising propellers and motors coupled to the frame;
   an electronic control unit in communication with the propulsion system;
   a wireless data interface in communication with the electronic control unit;
   a route planner detection instruction set stored in a memory, wherein when the route planner instruction set is executed by the electronic control unit, the electronic control unit evaluates location and orientation of a user's face and instructs the telepresence drone to navigate to a position in front of the user's face; and
   a hull positioned outside of the frame and the propulsion system, the hull comprising a plurality of openings through which the propulsion system acts on air to navigate through the environment.

2. The telepresence drone of claim 1, wherein the hull comprises ducted portions that direct air from the environment toward the propeller.

3. The telepresence drone of claim 2, wherein the ducted portions extend from a first side of the propeller to an outer surface of the hull and from a second side of the propeller to an outer surface of the hull.

4. The telepresence drone of claim 1, wherein the hull comprises a spherical shape.

5. The telepresence drone of claim 1, wherein the route planner instruction set that, when executed by the electronic control unit:
   evaluates the position and orientation of the user within the environment; and
   provides a route to the telepresence drone that satisfies predetermined location and orientation specifications.

6. The telepresence drone of claim 1, further comprising a noise cancelling system that reduces the volume of noise projected into the environment.

7. The telepresence drone of claim 1, further comprising a landing interface that is coupled to one of the frame or the hull.

8. The telepresence drone of claim 7, wherein the landing interface comprises a cylindrical recess that extends inward from the hull.

9. The telepresence drone of claim 7, wherein the landing interface comprises a tapered inlet that tapers inward in diameter from the hull.

10. The telepresence drone of claim 7, further comprising electrical contacts that are positioned on the hull and arranged with axisymmetric symmetry around the landing interface.

11. A telepresence drone system, comprising:
    a telepresence drone configured to navigate through an environment, the telepresence drone comprising:
       a frame;
       a propulsion system comprising propellers and motors coupled to the frame;
       an electronic control unit in communication with the propulsion system;
       a hull positioned outside of the frame and the propulsion system; and
       a landing interface comprising a recess that extends internally into one of the frame or the hull; and
    a plurality of landing pads arranged throughout the environment, wherein each of the landing pads is configured to be selectively engaged with and positioned within the recess of the landing interface of the telepresence drone.

12. The telepresence drone system of claim 11, wherein the telepresence drone communicates wirelessly with the landing pad to couple the landing pad with the landing interface of the telepresence drone.

13. The telepresence drone system of claim 11, wherein at least one of the landing pads comprises an extensible frame that selectively extends out of the landing pad and increases an interface diameter of the landing pad to interface with the landing interface of the telepresence drone.

14. The telepresence drone system of claim 11, wherein at least one of the landing pads comprises an expandable sheath that selectively increases an interface diameter of the landing pad to interface with the landing interface of the telepresence drone.

15. The telepresence drone system of claim 14, wherein at least one of the landing pads further comprises an inflatable bladder that selectively increases the interface diameter of the landing pad to interface with the landing interface of the telepresence drone.

16. The telepresence drone of claim 14, wherein at least one of the landing pads further comprises a traversing wedge element that selectively increases the interface diameter of the landing pad to interface with the landing interface of the telepresence drone.

17. The telepresence drone system of claim 11, wherein at least one of the landing pads further comprises a charging interface that that supplies power to the telepresence drone when the telepresence drone is coupled to the landing pad.

18. The telepresence drone system of claim 11, wherein the telepresence drone further comprises a route planner instruction set that, when executed by the electronic control unit, causes the electronic control unit to:
    evaluate the position and orientation of a user within the environment; and
    provide a route to the telepresence drone that satisfies predetermined location and orientation specifications.

19. The telepresence drone system of claim 18, wherein when the electronic control unit executes the route planner instruction set, the electronic control unit:

determines if one of the landing pads is positioned within the predetermined location and orientation specifications; and directs the telepresence drone to navigate to a position to be coupled to the landing pad.

\* \* \* \* \*

UNITED STATES PATENT AND TRADEMARK OFFICE
CERTIFICATE OF CORRECTION

| | |
|---|---|
| PATENT NO. | : 10,875,645 B2 |
| APPLICATION NO. | : 16/021611 |
| DATED | : December 29, 2020 |
| INVENTOR(S) | : Danil V. Prokhorov |

Page 1 of 1

It is certified that error appears in the above-identified patent and that said Letters Patent is hereby corrected as shown below:

In the Claims

In Column 10, Line(s) 55, Claim 17, after "interface", delete "that that" and insert --that--, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*